No. 757,793. Patented April 19, 1904.

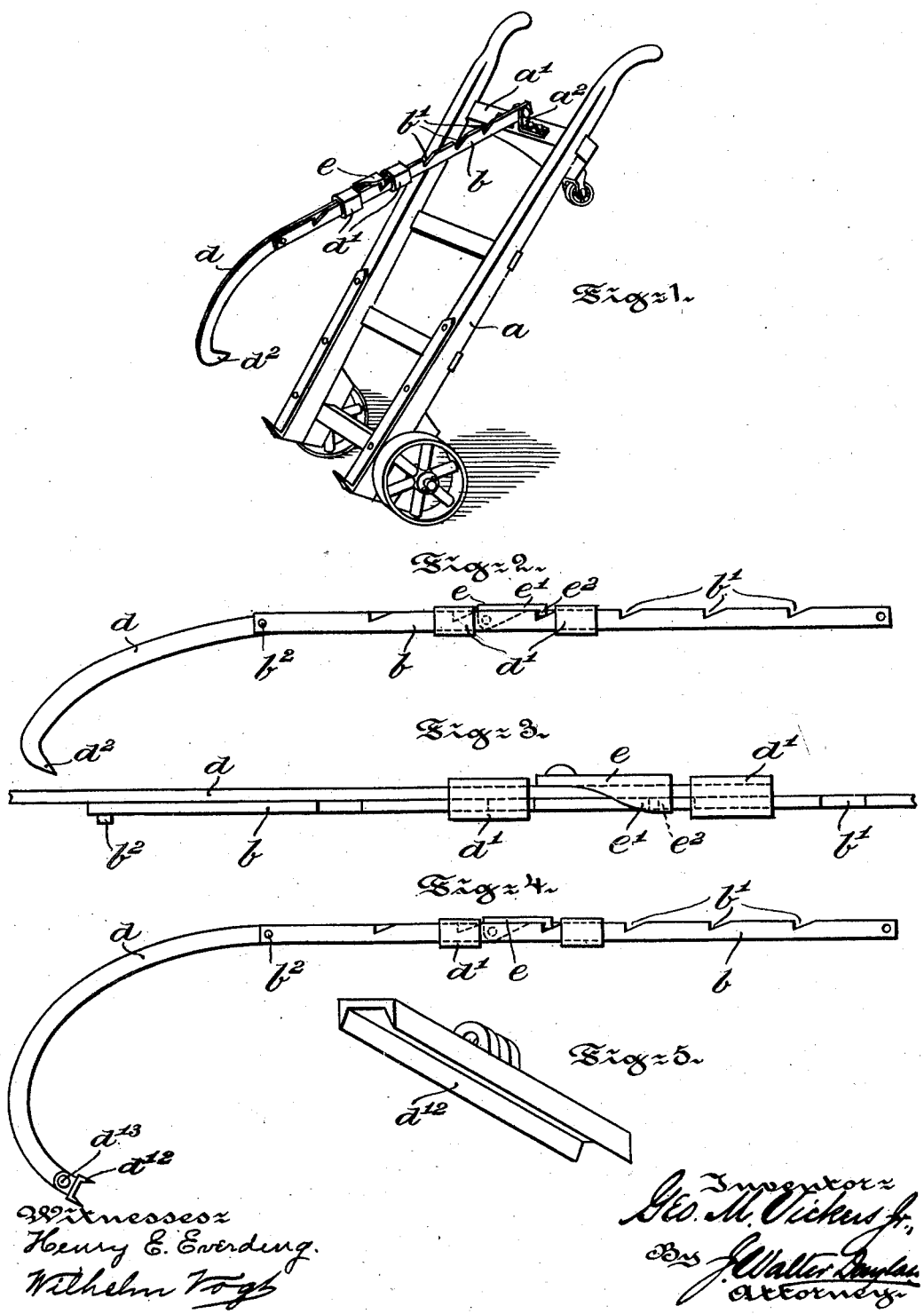

UNITED STATES PATENT OFFICE.

GEORGE M. VICKERS, JR., OF BALA, PENNSYLVANIA.

ADJUSTABLE HOOK FOR HAND-TRUCKS.

SPECIFICATION forming part of Letters Patent No. 757,793, dated April 19, 1904.

Application filed October 20, 1902. Renewed September 30, 1903. Serial No. 175,234. (No model.)

*To all whom it may concern:*

Be it known that I, GEORGE M. VICKERS, Jr., a citizen of the United States, residing at Bala, in the county of Montgomery and State of Pennsylvania, have invented certain new and useful Improvements in Adjustable Hooks for Hand-Trucks, of which the following is a specification.

My invention has relation to a hook adapted for use with a hand-truck in elevating and locking the load to the truck; and in such connection it relates to the construction and arrangement of the parts of such a hook whereby the hook may be adjusted with respect to its length.

The principal object of my invention is to provide in a hand-truck an adjustable hook consisting of two members, whereof one is pivotally secured at one end to the framework of the truck and the other is slidable upon the pivoted member, the two members being provided with a locking means adapted to be readily controlled to permit of the movement of one member or the other a required distance and the locking of the two members when adjusted to the required distance.

The nature and scope of my invention will be more fully understood from the following description, taken in connection with the accompanying drawings, forming part hereof, in which—

Figure 1 is a perspective view of a hand-truck and of the adjustable hook embodying main features of my invention in operative connection with the truck. Fig. 2 is a side view of the hook detached from the truck. Fig. 3 is a top or plan view, enlarged, of Fig. 2. Fig. 4 is a view similar to Fig. 2, but illustrating a modified form of hook; and Fig. 5 is a perspective view of the channel-piece pivotally connected to the free end of the hook illustrated in Fig. 4.

Referring to the drawings, $a$ represents the truck, preferably of the type illustrated in my former patent, No. 692,389, dated February 4, 1902. To preferably the rear crosspiece $a'$ of said truck is secured a bracket $a^2$, in which one end of the arm $b$ is pivotally secured. This arm $b$ forms one member of the adjustable hook and has upon its upper edge a series of ratchet-teeth $b'$. The second member $d$ of the hook is provided with the eye-brackets $d'$, arranged to receive the member $b$ and to permit of the sliding of the member $d$ back and forth upon the pivoted member $b$. The member $d$ is provided with a pawl $e$, pivoted at one side to the member $d$ and having a face $e'$ extending over the ratcheted upper edge of the member $b$. The face $e'$ has a depending lug $e^2$ arranged to engage the teeth $b'$ of the member $b$, so as to permit of a backward movement over the member $b$, but not a forward movement thereon. For this purpose the lug $e^2$ slides on the inclined portion of the teeth $b'$, but abuts and locks in the vertical face of said teeth. To permit the member $d$ to slide forward upon the member $b$, the pawl $e$ must be lifted out of engagement with the teeth $b'$. To prevent complete withdrawal of the sliding member $d$ from the pivoted member $b$, said pivoted member has a pin $b^2$ at its free end, which by engagement with one of the eye-brackets $d'$ prevents the further movement of said member $d$ upon the arm $b$. In Figs. 1 to 3 the forward end of the member $d$ is formed into a point or hook $d^2$, arranged to sink into the article to be elevated upon and locked to the truck $a$. In Figs. 4 and 5, however, a channel-piece $d^{12}$ is pivoted, as at $d^{13}$, to the free end of said member $d$. This channel-piece $d^{12}$ is especially useful in elevating bales upon the truck and in clamping said bales down thereon without entering the covering of the bale.

Having thus described the nature and object of my invention, what I claim as new, and desire to secure by Letters Patent, is—

1. In an adjustable hook for a hand-truck, two members, whereof one is adjustable upon the other, combined with means for locking the two members in required position, and a channel-piece pivotally secured to the free end of one of the members and adapted to assume different angular positions with respect to said member.

2. In an adjustable hook for a hand-truck, two members arranged alongside each other, one of said members having teeth and pivotally secured to the truck, and the other member having a channel-piece pivotally secured to one end thereof and adapted to assume different angular positions with respect to said member and independent of the position of the same, and at the other end having a bracket and pawl, said bracket adapted to slidably connect the two members and said pawl adapted to couple the same with each other by engaging the teeth of the pivotal member.

In testimony whereof I have hereunto set my signature in the presence of two subscribing witnesses.

GEO. M. VICKERS, JR.

Witnesses:
J. WALTER DOUGLASS,
THOMAS M. SMITH.